United States Patent [19]

Smith

[11] 3,819,581

[45] June 25, 1974

[54] EPOXY RESIN COMPOSITIONS CONTAINING AROMATIC DISULFONAMIDE SALTS

[75] Inventor: Harry A. Smith, Midland, Mich.

[73] Assignee: The Dow Chemical Company, Midland, Mich.

[22] Filed: Apr. 2, 1973

[21] Appl. No.: 347,171

[52] U.S. Cl. 260/47 EN, 117/132 BE, 117/161 ZB, 161/104, 260/2 N, 260/33.2 EP, 260/33.6 EP, 260/49, 260/59, 260/78.4 EP
[51] Int. Cl............................................ C08g 30/14
[58] Field of Search.. 260/47 EN, 2 N, 59, 78.4 EP, 260/49, 79, 556 AR, 33.2 EP

[56] References Cited
UNITED STATES PATENTS
2,712,001  6/1955  Greenlee............................... 260/47
3,277,050  10/1966  Pettigrew............................... 260/47

*Primary Examiner*—William H. Short
*Assistant Examiner*—T. Pertilla
*Attorney, Agent, or Firm*—Benjamin G. Colley

[57] ABSTRACT

Latent curing epoxy resin compositions are described which comprise (1) an epoxy resin such as the diglycidyl ether of bisphenol A, (2) an aromatic disulfonamide such as diphenyl oxide disulfonamide and (3) a salt of an aromatic disulfonamide with substituted tertiary amines or hydrocarbon substituted phosphines wherein components (1), (2) and (3) are present in quantities so as to provide an amine hydrogen equivalent: epoxy equivalent ratio of at least about 0.9:1 and (3) is present in an amount greater than 1.0 weight percent based on the amont of (2).

8 Claims, No Drawings

EPOXY RESIN COMPOSITIONS CONTAINING AROMATIC DISULFONAMIDE SALTS

BACKGROUND OF THE INVENTION

This invention relates to latent curing epoxy resin compositions comprising an epoxy resin and a salt of an aromatic disulfonamide with substituted tertiary amines or substituted phosphines.

Commonly employed latent curing agents for epoxy resins include accelerated dicyandiamide. It is also known that aromatic disulfonamides are latent curing agents for epoxy resins.

SUMMARY OF THE INVENTION

It has now been discovered that epoxy resins employing a salt of an aromatic polysulfonamide with substituted tertiary amines or substituted phosphines as the latent curing agent have greater latency than accelerated dicyandiamide systems due to the tying up of the accelerator in the form of an inactive salt which can be reactivated by heat during the curing process.

The latent curing epoxy resin compositions of the present invention comprise 1. an epoxy resin having an average of more than one 1,2-epoxy group per molecule,
2. an aromatic disulfonamide, and
3. a salt of an aromatic disulfonamide with substituted tertiary amines or hydrocarbon substituted phosphines wherein components (1), (2) and (3) are present in quantities so as to provide an amine hydrogen equivalent: epoxy equivalent ratio of at least about 0.9:1 and (3) is present in an amount greater than 1.0 weight percent based on the amount of (2).

DETAILED DESCRIPTION

Suitable epoxy resins for use in this invention have an average of more than one 1,2-epoxy group per molecule. These include, for example, those epoxy resins represented by the following general formulae:

A. 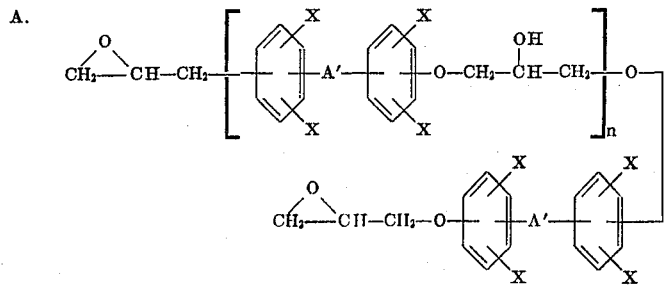

wherein each A' is independently selected from the group consisting of a divalent hydrocarbon group having from 1 to 4 carbon atoms, —S—, —S—S—,

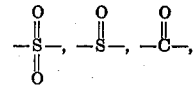

—O—, X is hydrogen or a halogen and $n$ is an integer having an average value of from about 0 to about 10;

B. 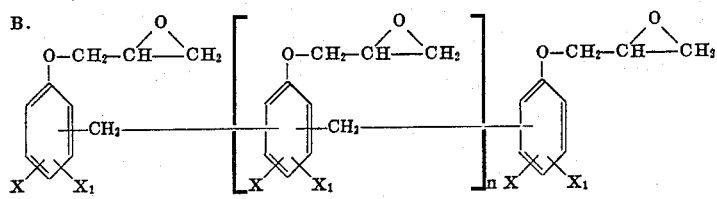

wherein X and $X_1$ are independently selected from the group consisting of hydrogen, an alkyl group having from about 1 to 4 carbon atoms and a halogen and $n$ is an integer having an average value of from about 0.1 to about 4;

C. 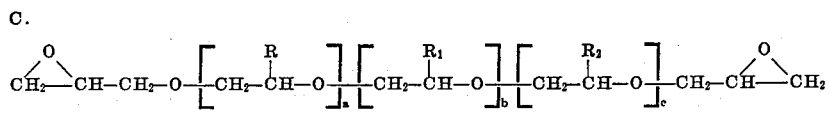

wherein R, $R_1$ and $R_2$ are independently hydrogen, an alkyl or haloalkyl group having from about 1 to about 4 carbon atoms, and $a$, $b$ and $c$ are integers, the sum of which is an integer having an average value of from about 3 to about 40;

D. 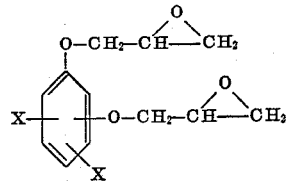

wherein X and $X_1$ are as indicated in formula B above.

E. 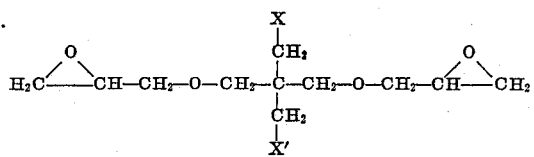

wherein X and X' are independently selected from hydrogen, chlorine and bromine.

F.

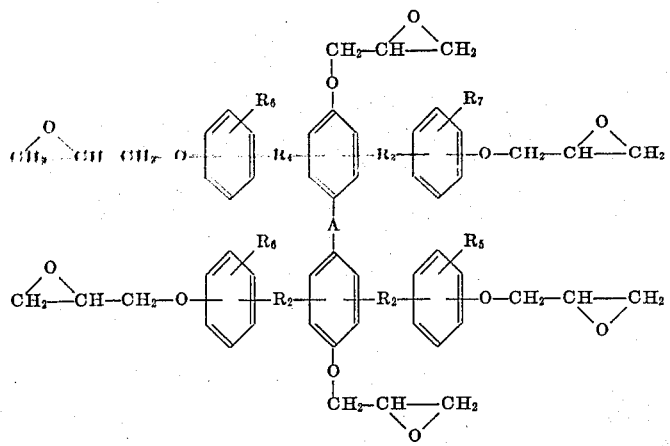

wherein A is a divalent radical selected from the group consisting of alkylidene, cycloalkylidene, —S—, —S—S—,

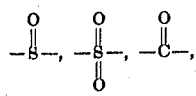

—O—; $R_1$, $R_2$, $R_3$ and $R_4$ are independently alkylidene groups and $R_5$, $R_6$, $R_7$ and $R_8$ are independently halogen, hydrogen or alkyl groups having from 1 to about 4 carbon atoms.

Suitable disulfonamide salts which are employed in the novel latent curing epoxy resin compositions of the present invention include those represented by the general formulae:

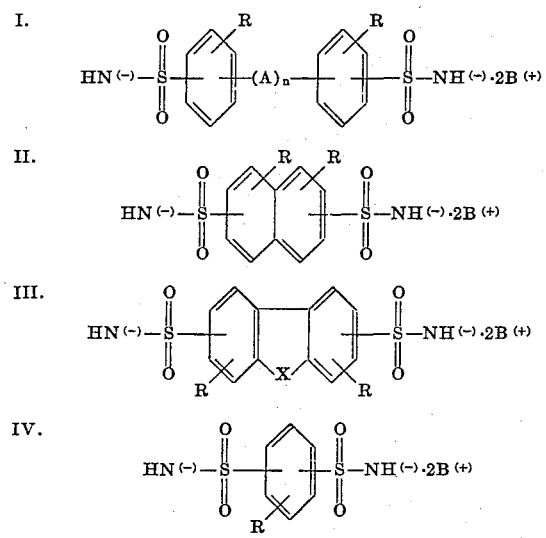

wherein A is a divalent hydrocarbon group having from 1 to about 6 carbon atoms, —S—, —O—,

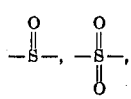

—S—S—, or a single bond, each R is independently hydrogen, an aliphatic hydrocarbon group having from 1 to about 6 carbon atoms, Cl, Br, —O—R' wherein R' is an alkyl group having from 1 to about 6 carbon atoms, $n$ has a value of 0 or 1, X is O or S, and B is substituted tertiary amine or a substituted phosphine.

Disulfonamide salts such as represented by the above formulae I-IV include, for example, salts of diphenylether-4-4'-disulfonamide, di(bromophenyl)ether-4,4'-disulfonamide, di(methylphenyl)ether-4,4'-disulfonamide, di(butylphenyl)ether-4,4'-disulfonamide, di(propylphenyl) ether-4,4'-disulfonamide, di(chlorophenyl)ether-4,4'-disulfonamide, naphthalene-1,5-disulfonamide, methylnaphthalene-1,5-disulfonamide, ethyl-naphthalene-1,5-disulfonamide, dipropylnaphthalene-1,5-disulfonamide, chloronaphthalene-1,5-disulfonamide, chloronaphthalene-2,6-disulfonamide, bromonaphthalene-1,5-disulfonamide, dibromonaphthalene-1,5-disulfonamide, meta- and para-phenylene disulfonamide, dibenzofuran disulfonamide, dibenzothiophene disulfonamide and the like, wherein the anionic moieties (B) are substituted tertiary amines such as 2-methylimidazole, dimethyl aniline, triethylenediamine, hexamethylene tetramine, triethylamine, triethanolamine and the like or hydrocarbon substituted tertiary phosphines such as triaryl phosphines such as triphenyl phosphine or trialkyl phosphines such as trimethyl phosphine, triethyl phosphine and the like.

The disulfonamide starting materials are conveniently prepared by chlorosulfonating the desired aromatic compound with at least a stoichiometric quantity of a suitable chlorosulfonation agent such as, for example, chlorosulfonic acid at a temperature of from about 50°C. to reflux for from about 2 to about 6 hours or longer. The resultant disulfonyl chloride after removal of any excess chlorosulfonation agent is then reacted with aqueous or anhydrous ammonia at 40°–150°C. under autogenous pressure for from about 2 to about 24 hours. The resultant disulfonamide is then precipitated in cold water, filtered and the product is finally recovered by slurrying the precipitate in hot water and again filtering. The disulfonamide salts are those prepared from the disulfonamide by dissolving the disulfonamide and the appropriate amount of base in a ketonic solvent and then removing the solvent to obtain the salt so produced.

The compositions of the present invention may also contain one or more of such additives such as, for example, flow control agents, accelerators, pigments, solvents, dispersing agents, fire retardant compounds and the like.

The compositions of the present invention are useful in such applications as coating, adhesives, castings, laminates and the like.

The compositions of the present invention exhibit much improved latency, cured film clarity and cured film gloss over conventional dicyandiamide cured epoxy resin systems.

Examples 1–4

Coating solutions were prepared as in Table I from an epoxy resin (DER 331) employing diphenyl oxide disulfonamide (DPODSA) as the latent curing agent and also containing salts of DPODSA with 2-methyl imidazole (2-MI) or triphenyl phosphine (TPP). For comparative purposes, a coating solution was prepared employing 2-methyl imidazole alone as the curing agent. The coating compositions were applied to Bonderite 37 treated cold rolled steel panels at a coating thickness of about 0.5 mil., cured and tested as indicated in Table II. "Bonderite" is the trade name of the Parker Rust Proof Division of the Hooker Chemical Corporation for their phosphate surface coating for metals.

The Hot Tack Test is an indication of curing. A wooden tongue depressor was drawn across the hot coating surface and if the coating was marked, a lack of cure was indicated. If it was not marked, then the coating was deemed to have cured. In the Table, a "yes" indicates that the coating was marked by the tongue depressor while a "no" indicates that the coating was not marked.

The reverse impact test is carried out using a four pound dart having a one inch ball on its tip which is dropped from various heights onto the backside of the panel. Impact (weight of dart in pounds times the height of drop in inches) distorts the panel and coating into a cavity and indicates coating toughness. Pass means no fracture or flaking of the coating. Fail means the opposite.

MEK test is a solvent resistance spot test wherein a piece of paper toweling is saturated with methylethylketone, placed on the coating and covered with a watch glass for 3 minutes. The glass and towel are removed by wiping and the effect on the coating is observed.

TABLE I

| | Coating Formulations | | | | |
|---|---|---|---|---|---|
| | Control | Ex. 1 | Ex. 2 | Ex. 3 | Ex. 4 |
| DER 331* | 69.8 g. (0.367 eq.) | 69.8 g. | 69.8 g. | 69.8 g. | 69.8 g. |
| DPODSA | 30.2 g. (0.368 eq.) | 28.2 g. | 26.2 g. | 29.6 g. | 28.55 g. |
| 2-MI | 1.2 g. | — | — | — | — |
| 1/1 2-MI - DPODSA Salt** | — | 2.5 g. | 5.0 g. | — | — |
| 1/1 TPP - DPODSA Salt** | — | — | — | 1.14 g. | 2.96 g. |
| Dowanol EM*** | 100.0 g. | 100.0 g. | 100.0 g. | 100.0 g. | 100.0 g. |
| % Catalyst (Based on Solids) | 1.2 | 0.5 | 1.0 | 0.5 | 1.3 |

\* Trademark diglycidyl ether of Bisphenol A having an epoxy equivalent weight of about 190
\*\* 1/1 Mole ratio mixtures of the compounds described and free DPODSA
\*\*\* Trademark for the monomethyl ether of ethylene glycol

TABLE II

| Formulation | Results of Oven Cures of Epoxy Coating Formulations | | | | |
|---|---|---|---|---|---|
| | Control | Ex. 1 | Ex. 2 | Ex. 3 | Ex. 4 |
| 350°F. Cures | | | | | |
| 15 Minutes | | | | | |
| Hot Tack | No | No | No | — | — |
| 160 In. Lb. Reverse Impact | Pass | Pass | Pass | — | — |
| MEK Spot Test (3 Min.) | ~No effect | ~No effect | ~No effect | — | — |
| 300°F. Cures | | | | | |
| 15 Minutes | | | | | |
| Hot Tack | — | No | — | Yes | Yes |
| 160 In. Lb. Reverse Impact | — | Pass | — | — | — |
| MEK Spot Test (3 Min.) | — | Softens | — | — | — |
| 30 Minutes | | | | | |
| Hot Tack | — | No | — | Yes | Yes |
| 160 In. Lb. Reverse Impact | — | Pass | — | — | — |
| MEK Test (3 Min.) | — | No effect | — | — | — |
| 60 Minutes | | | | | |
| Hot Tack | — | No | — | Yes | No |
| 160 In. Lb. Reverse Impact | — | Pass | — | — | Fails at about 20 In. Lb. |
| MEK Test (3 Min.) | — | No effect | — | — | Disintegrates (in./min.) |
| 120 Minutes | | | | | |
| Hot Tack | — | No | — | No | No |
| 160 In. Lb. Reverse Impact | — | Pass | — | Fails, pass at 80 In. Lb. | Pass |
| MEK Test (3 Min.) | — | No effect | — | Softens badly at 1 Min. | Slight softening |

Examples 1–4 were stored at room temperature (25°C.) in order to determine shelf lives. The results are shown in Table III.

A comparable control containing one equivalent of dicyandiamide per equivalent of epoxy resin catalyzed with 0.5 percent 2-methyl imidazole by weight has a shelf life of 3–7 days. Example 1, after one month of aging at room temperature, gave the same results when cast and cured as it had when freshly prepared indicating no loss in properties on aging.

TABLE III

| Example | Latency of Solutions in Table I | | | |
|---|---|---|---|---|
| | 1 | 2 | 3 | 4 |
| Shelf Life (Room Temp.) | 2 months | 2½ weeks | 6 months | 3 months |
| Catalyst Level | 0.5% 2-Methyl Imidazole | 1.0% 2-Methyl Imidazole | 0.5% Triphenyl Phosphine | 1.3% Triphenyl Phosphine |

Table IV

Latency of Dispersion Coating Systems

| Examples | 5 | 6 |
|---|---|---|
| Shelf Life | >9 months | >9 months |
| Catalyst | 2-Methyl Imidazole | 2-Methyl Imidazole |
| % | 0.5% | 1.0% |

TABLE V

| | Coating Formulations | | | | |
|---|---|---|---|---|---|
| Example | 7 | 8 | 9 | 10 | 11 |
| DER 663* | 95 g. | 95 g. | 95 g. | 95 g. | 95 g. |
| DPODSA | 2.39 g. | 4.73 g. | 6.28 g. | 4.3 g. | 6.0 g. |
| DPODSA-Amine Salt | 4/1** salt- 9.14 g. | 4/1** salt- 6.80 g. | 3.5/1** salt- 5.25 g. | 6.5/1** salt- 7.3 g. | 3.5/1** salt- 5.8 g. |
| Amine | 2-MI | Dabco (triethylene diamine) | Triethanol Amine | Triethyl Amine | Hexamethylene Tetramine |
| % Amine Catalyst | 0.5% | 0.5% | 0.5% | 0.5% | 0.5% |
| Dowanol EM | 170 g. | 170 g. | 170 g. | 170 g. | 170 g. |

\* Trademark for the diglycidyl ether of Bisphenol A having an epoxy equivalent weight of about 775
\*\* Mole ratio of DPODSA/amine in the salt mixture

Examples 5 and 6

Examples 1 and 2 were repeated using 40 gms. of toluene in place of the 100 gms. of Dowanol EM. The shelf lives of these examples are given in Table IV.

A control using the same relative amounts of dicyandiamide and 2-methyl imidazole as in the control for the solution system above has a shelf life of about one week due to the solubility of the 2-methyl imidazole in the resin-solvent mixture.

Examples 7–11

The procedures of Examples 1–4 were repeated using DER 663 and various tertiary amines. The coating formulations are given in Table V.

The above formulations were applied to Bonderite 37 treated cold rolled steel panels at a coating thickness of about 0.5 mil and cured and tested as indicated in Table VI.

TABLE VI

| Example | 7 | 8 | 9 | 10 | 11 |
|---|---|---|---|---|---|
| Min. Time to Absence of Hot Tack | 10 min. | 10 min. | 45 min. | >30 min. | 10 min. |
| Reverse Impact Resistance at Cure | >160 in./lb. | >160 in./lb. | >160 in./lb. | >160 in./lb. | >160 in./lb. |
| Cure Time to Resist Solvent Attack (1 min. MEK Spot Test) | 15 min. | 10 min. | >45 min. | >30 min. | 10 min. |

I claim:
1. A latent curing epoxy resin composition comprising
   1. an epoxy resin having an average of more than one 1,2-epoxy group per molecule,
   2. an aromatic disulfonamide, and
   3. a salt of an aromatic disulfonamide with substituted tertiary amines or hydrocarbon substituted phosphines selected from triaryl phosphines or tri- alkyl phosphines wherein components (1), (2) and (3) are present in quantities so as to provide an amine hydrogen equivalent:epoxy equivalent ratio of at least about 0.9:1 and (3) is present in an amount greater than 1.0 weight percent based on the amount of (2).

2. The composition of claim 1 wherein the amine hydrogen equivalent:epoxide equivalent ratio is from about 0.9:1 to about 1.25:1 and the amount of aromatic disulfonamide salt used is in the range from 5.0 to 100.0 weight percent based on the aromatic disulfonamide.

3. The composition of claim 2 wherein the disulfonamide is diphenyl oxide disulfonamide.

4. The composition of claim 2 wherein the aromatic disulfonamide salt is a salt of an aromatic disulfonamide with substituted tertiary amines or hydrocarbon substituted tertiary phosphines selected from triaryl phosphines or trialkyl phosphines.

5. The composition of claim 4 wherein the substituted tertiary amine is 2-methyl imidazole, dimethyl aniline, triethylene diamine, hexamethylene tetramine, triethylamine or triethanolamine.

6. The composition of claim 2 wherein the epoxy resin is a glycidyl ether of bisphenol A with epichlorohydrin.

7. The composition of claim 3 wherein the epoxy resin is a glycidyl ether of bisphenol A with epichlorohydrin.

8. A coating composition containing the composition of claim 1 and an organic solvent.

* * * * *